H. W. LEONARD.
MEANS FOR CONTROLLING ELECTROMOTIVE FORCE.
APPLICATION FILED DEC. 23, 1905.

1,061,192.

Patented May 6, 1913.

2 SHEETS—SHEET 1.

Witnesses
L. K. Sager.
Geo. N. Kerr

H. Ward Leonard  Inventor
By his Attorney  C. W. Edwards

UNITED STATES PATENT OFFICE.

HARRY WARD LEONARD, OF BRONXVILLE, NEW YORK.

MEANS FOR CONTROLLING ELECTROMOTIVE FORCE.

1,061,192.  Specification of Letters Patent.  Patented May 6, 1913.

Application filed December 23, 1905. Serial No. 293,048.

*To all whom it may concern:*

Be it known that I, HARRY WARD LEONARD, a citizen of the United States, residing at Bronxville, in the county of Westchester and State of New York, have invented certain new and useful Improvements in Means for Controlling Electromotive Force, of which the following is a full, clear, and exact specification.

My invention relates to means for controlling electric energy.

The principal object is to provide improved means for controlling the electromotive force upon a translating device, or for controlling some element or condition dependent upon the electromotive force.

One important application of my invention is to the control of the speed of an electric motor at any desired speed while it is supplied from a substantially constant electromotive force source of supply.

My invention will be understood from the following description and accompanying drawings.

My invention is susceptible of various modifications, and although I have shown and described certain specific methods and means, it will be understood that I am limited in the scope thereof only as indicated by the appended claims.

Figure 1:
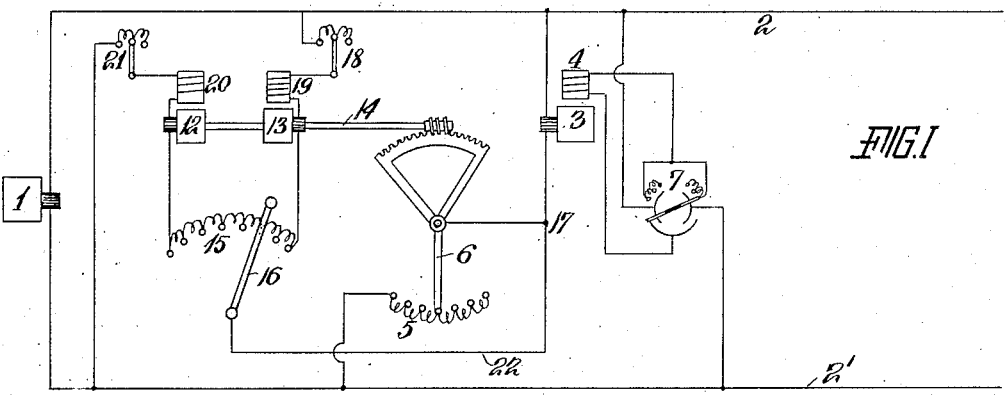

Figure 1 is a diagram of an apparatus embodying my invention; and Figs. 2 to 7 inclusive, are diagrams of various modifications.

Referring to Fig. 1, a source of electric energy is indicated at 1 which supplies current to the mains 2, 2' of substantially constant electromotive force. The translating device to be controlled is indicated as a motor having the armature 3 and field 4. The rheostat is shown connected in the circuit of the motor, there being an adjustable resistance 5 in the armature circuit, the variation of which will of course control the electromotive force applied to the armature terminals. The armature circuit is from line 2, through armature 3 to the arm 6 of the rheostat, thence through steps of resistance 5, and then to line 2'. In this instance, I have shown the field 4 also subject to variation in its strength by means of a variable resistance and reversible rheostat 7. By adjusting the rheostat 7 the direction of rotation of the motor controlled may be made that desired and the field strength may be varied within limits to assist in adjusting the speed of the motor. It is clear that the movement of the rheostat arm 6 from the right will gradually cut out steps of resistance 5, gradually increasing the electromotive force applied to the armature to the maximum.

The position of the rheostat arm 6 is controlled by two small electric motors, the armatures 12, 13 of which are mounted upon a shaft 14 which engages the arm 6 by a worm and gear connection. Between the two terminals of the armatures 12, 13 is connected an adjustable resistance 15. An arm 16 passes over the contacts of the variable resistance and is adapted to be placed in any position desired by manual operation. The arm 16 is electrically connected to a point in the circuit of the armature 3 of the motor to be controlled, which point is between the armature 3 and its controlling rheostat. The potential of this point, designated as 17, and of the armature terminal will consequently normally be the same as that of the arm 16. The small motors for driving the shaft 14 are shown as series motors, and are connected in circuit as follows: from line 2 through an adjustable resistance 18, series field 19 of armature 13, then through armature 13 to a terminal of the adjustable resistance 15, then from the other terminal of resistance 15 through the armature 12 and its series field 20, and then through an adjustable resistance 21 to line 2'. The connections of the two small motors on the shaft 14 are such that their torques normally oppose each other, one tending to rotate the shaft in one direction and the other tending to rotate the shaft in the opposite direction, so that under normal conditions they will remain at rest. It is evident that movement of the arm 16 will vary the potential thereof from that of one supply main to that of the other substantially, the resistances 18 and 21 being capable of variation to secure any desired change in the particular use or application.

To explain the operation of my invention, suppose it be assumed that the devices in the positions shown in Fig. 1 are securing normal operation of the motor, there being a certain amount of resistance in series with the armature 3 of the motor controlled, and the motor running with a constant load and a constant speed. The motor is then subjected to a constant electromotive force and the potentials of point 17 and arm 16 remain fixed, there being no current in the connection 22. The same current then passes through the armatures and field windings of the motors which operate shaft 14, and the same current also passes through the resistance 15 and any other resistances which may be in the circuit. Under these conditions the torques of the two small motors are equal and opposite, and the shaft 14 and arm 6 remain in a fixed position.

Now suppose the torque of the armature 3 to be changed. The current through this armature changes instantly, and hence the drop in volts in the part of resistance 5 in circuit changes and the potential of point 17 therefore changes. This unbalancing of the potential of the point 17 with reference to that of the arm 16 causes a flow of current in the connection between them, and a division of the current through the two small motors, the current in one armature and its field increasing, and that of the other armature and its field decreasing. A powerful resultant torque is therefore produced which tends to turn shaft 14 in one direction or the other, and consequently adjust the arm 6 to a new position so as to change the drop in electromotive force in the resistance 5, and bring the potential of point 17 to that of the arm 16 as before. As soon as this is accomplished the current through the two small motors again becomes the same, and they therefore remain at rest until another disturbance of normal conditions occurs. The apparatus will therefore automatically act to correct any deviation from the constant electromotive force desired at the terminals of the motor controlled, and thereby maintain a substantially fixed speed of the motor.

By moving the arm 16, the operator can maintain any desired fixed electromotive force at the terminals of the motor armature or other translating device, and thus secure any desired fixed speed of the motor or any other condition depending upon the requirement of maintaining a constant electromotive force under conditions subject to variation.

Figure 2:
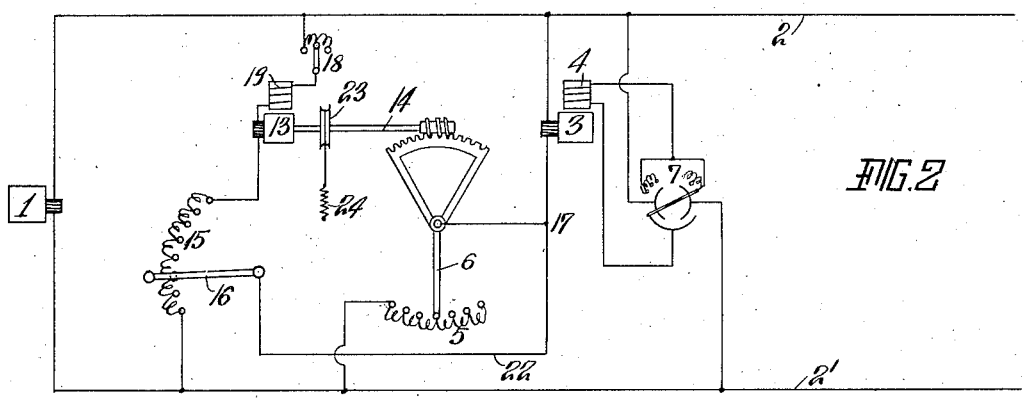

In some cases I might substitute for one of the small motors on the shaft 14, a spring, compressed air, gravity, or any other equivalent torque producing means. A change of this nature is indicated in Fig. 2. Here the armature 12 and field 20 are removed from the circuit, and instead there is mounted on shaft 14 a grooved wheel 23, over which passes a cord fixed to the wheel and to one end of the spring 24. The other end of the spring is fixed, and the spring consequently exerts a constant torque on the shaft 14 by tending to unwind the cord from the grooved wheel 23. This torque is normally balanced by the torque of the armature 13 when current passes from main 2 through the field 19, armature 13 and resistance 15 to line 2'. When the potential of point 17 changes from that desired, and consequently from the potential of arm 16, a different current will flow through the small motor; and by the increase or decrease of current, which depends upon the change in conditions, the torque of the motor will be changed and the resultant torque on shaft 14 will cause it to rotate in one direction or the other, to restore normal conditions. For example, if it be assumed that the torque and current of the motor controlled has increased so that the potential of point 17 is changed from that desired, and consequently nearer the potential of main 2 than before, a decreased current will flow through the field 19 and armature 13 of the small motor, and as this decreases the torque of the small motor, the spring pressure will overbalance it and cause the arm 6 to be turned to cut out more of resistance 5 and thereby restore the potential of the point 17 to its desired amount.

Figure 3:
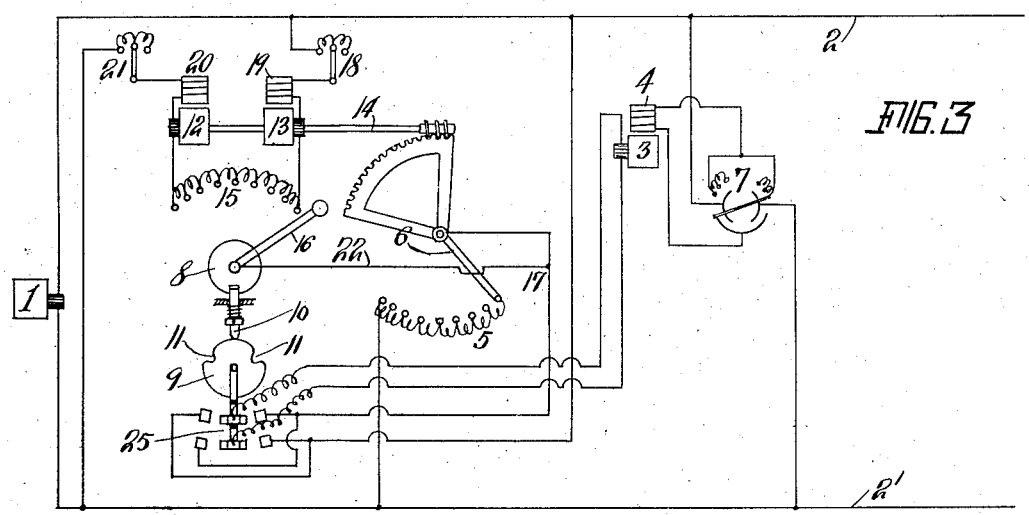

In order to secure a reversal of the motor controlled so as to obtain full speed in each direction as desired, I may reverse either the field or armature circuit of the motor controlled. I have indicated the field circuit of the motor as reversible, but it will be preferable to associate the controlling switch so that it may be actuated only under proper conditions, or interlocked so that the reversing switch can only be thrown when the apparatus is in a protective condition. Such a construction is indicated in Fig. 3, the parts similarly designated corresponding to the same parts in Figs. 1 and 2. A reversing switch in the circuit of armature 3 is indicated at 25. This is shown interlocked with the controlling device by means of a recessed plate 8 which turns with the controller 16, a plate 9 which turns with the reversing switch and a pin 10 which is spring pressed toward the plate 9, and which is adapted to engage the recess in plate 8 or either of the recesses 11, 11 in plate 9. It will be evident that the controlling arm 16 cannot be thrown from the initial position until the reversing switch has been thrown to one or the other closed positions. The pin 10 would then be forced out of the recess in plate 8 by its spring and release the controlling switch. Before the reversing switch could be thrown, it would always be necessary to return the controlling switch to the initial position so as to give an opportunity for the pin 10 to be forced into the recess in plate 8 when the reversing switch is thrown. The reversing switch can therefore be thrown only when the controlling apparatus is in a protective position, because the movement of the controlling switch 16 to the initial position causes the apparatus to act automatically to bring the rheostat in series with armature 3 to a protective condition.

Obviously other forms of interlocking means might be employed, or the controlling and reversing switches might be associated in other ways.

Figure 4:
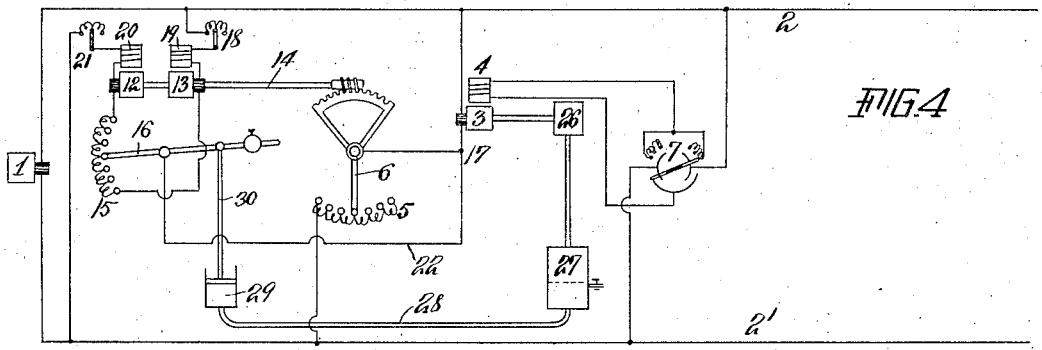

By arranging the arm 16 so that its position will be automatically controlled, depending upon the condition of the work to be performed, I may obtain a device which is entirely automatic throughout. I may thus secure automatic pumping apparatus in which the position of arm 16 is determined by the position of the float, or it may be determined by the pressure of some fluid, or by other varying conditions. In Fig. 4, an apparatus is illustrated similar to that of Fig. 1, and the motor controlled in the present figure is shown as driving a pump 26, which may supply a fluid to the reservoir 27. From the reservoir 27, a pipe 28 is shown as extending to a cylinder 29 in which is located a piston which is connected by rod 30 to an extension of arm 16. The extension on the arm 16 is shown as weighted to oppose the pressure in the cylinder 29. Instead of the piston in cylinder 29 being acted upon by pressure of the fluid, its position may be regarded as being determined by the level of the liquid in the cylinder 29, which level would correspond to that in the reservoir 27. If the pressure or level of the fluid in cylinder 29, becomes less than that desired, the arm 16 will be moved by gravity or some other constant pressure, so that its potential will approach that of the line 2', and consequently cause an increased electromotive force to be applied to the motor armature controlled. If the pressure or level in cylinder 29 exceeds the normal amount desired, the arm 16 will be moved so that its potential will approach that of the main 2, and thereby cause a reduced electromotive force to be applied to the armature 3. The motor controlled will thus be caused to work in accordance with the demands upon it, and according to the extent of the variations from normal conditions.

Figure 5:
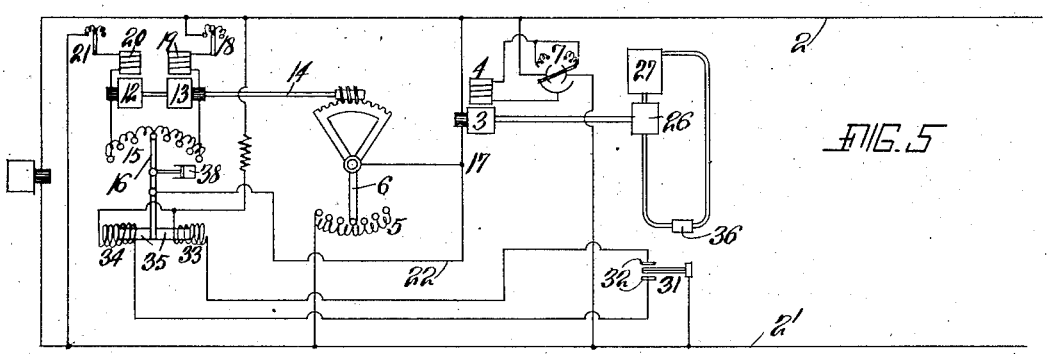

My invention may be applied to the control or regulation of temperature and other varying conditions. In Fig. 5, I have shown the position of the arm 16 controlled electrically from a distant point. The control is automatic, depending upon the temperature. A thermostat is indicated at 31 located at the point where it is desired to maintain a substantially constant temperature. The thermostat is connected to one supply line and is adapted to engage one or the other of contacts 32 and so close the circuit through a solenoid 33 or 34. An extension of arm 16 carries a core 35, which is attracted either by coil 33 or coil 34 when current flows through one or the other. A dash-pot 38 is attached to arm 16 to prevent a too sudden movement. The position of the arm 16 will thus be automatically determined and so cause the motor controlled to operate with an increased or decreased speed and restore the desired constant temperature. I have therefore indicated the motor as driving a pump 26 which will supply a heated fluid for example, from the reservoir 27 to a device 36 to regulate the temperature to that desired.

Figure 6:
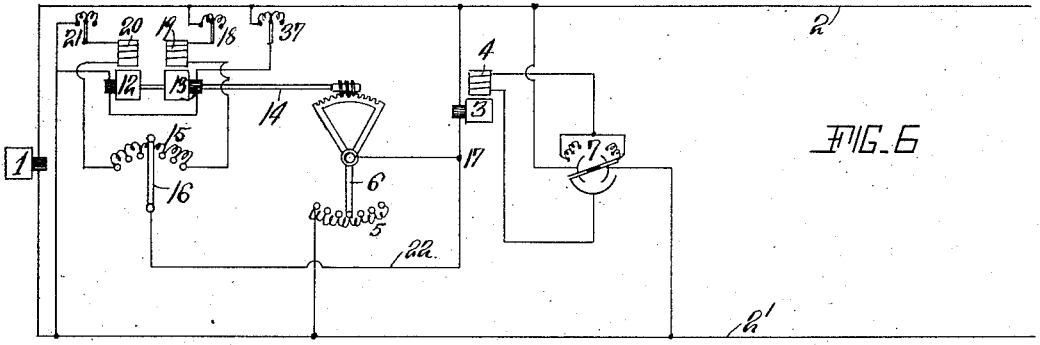

While I have shown the small regulating motors in the preceding figures as of the series type, they may be otherwise connected. For example, I may connect the armatures 12, 13 across the circuit in series with a resistance and adapt the resistance arm 16 to control the fields of the small motors. This arrangement is shown in Fig. 6, the armatures 12, 13 being connected across the line in series with a resistance 37 and the fields 19, 20 being connected in series across the line with the resistance 15 in circuit between them.

Figure 7:
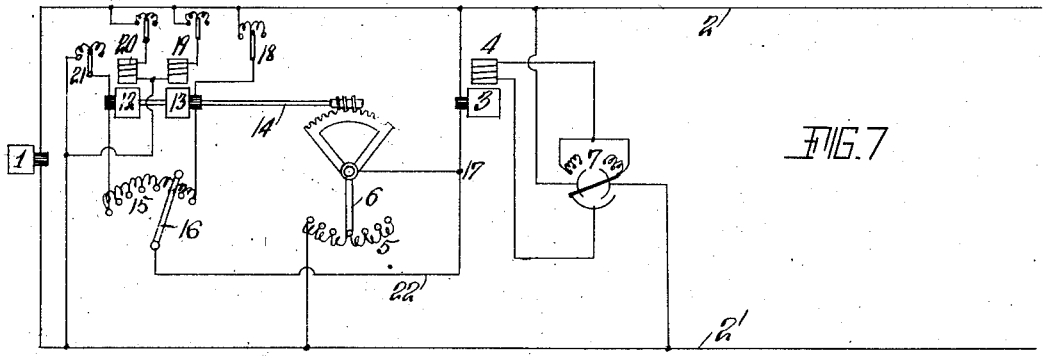

In Fig. 7, I have shown the reverse arrangement, the armatures 12, 13 being connected in series across the line with the resistance 15 interposed between them and with the resistances 18, 21 between the armatures and line wires, and the fields 19, 20 each being connected across the line independently with an adjustable resistance in series with each for adjusting their strength as desired.

Having thus described my invention, I declare that what I claim as new and desire to secure by Letters Patent, is,—

1. The combination of a source of electric energy, a translating device which requires varying currents in its operation, a device for varying the electromotive force applied to said translating device, and automatic means for controlling said varying device to maintain upon said translating device an electromotive force different from that of said source, said means comprising two movable opposing electro-responsive devices and an adjustable device in series with each other across said source.

2. The combination of a source of electric energy, a translating device, a device for varying the electromotive force applied thereto independently of change of electromotive force of said source, and automatic means for controlling said varying device, said means comprising two opposing electric motors connected in series across said source.

3. The combination of a source of electric energy, a translating device, a device connected to said translating device for varying the electromotive force applied thereto, automatic means for controlling said varying device, said means comprising an electroresponsive device connected across said source, and an adjustable device connected to said translating device and to said electroresponsive device for determining the desired potential at the point of connection of said varying device to said translating device.

4. The combination of a source of electric energy, a translating device, a device for varying the electromotive force applied thereto, automatic means for controlling said varying device, said means comprising an electro-responsive device connected across said source, an adjustable device connected to said translating device and to said electro-responsive device for determining the desired potential upon said translating device, and automatic means dependent upon service conditions for controlling said adjustable device.

5. The combination of a source of constant electro-motive force, an electric motor, a variable resistance in series with the armature of said motor connected across said source, two force producing electric devices connected in series across said source, an electrical connection from a point between said two devices to a point between said motor armature and said resistance, and means whereby the potential of one of said points is made to correspond with that of the other.

6. The combination of a constant potential supply circuit, an electric motor supplied with energy from said circuit, two movable opposing electro-responsive devices connected to said circuit, an electrical connection extending from a point of connection between said two devices to a terminal of the armature of said motor, and controlling means comprising a device individually in series with the motor armature across said supply circuit for automatically maintaining upon said terminal a desired potential.

7. The combination of a supply circuit, a winding in which an electromotive force is developed and a rheostat in series with each other across said circuit, a field winding for said first named winding energized independently of the electromotive force upon said first named winding, two counteracting devices for controlling said rheostat, and means for causing at least one of said devices to be responsive to a change of electromotive force upon the terminals of said first named winding.

8. The combination of an electric motor whose speed is to be controlled, two electromagnetic devices producing counter acting mechanical forces normally balanced, at least one of said forces being responsive to a change of speed of the motor so as to cause said forces to become unbalanced, and means controlled by said unbalanced forces to restore the normal speed of the motor.

9. The combination of a motor to be controlled at different constant speeds, two devices producing counteracting mechanical forces normally balanced, said devices being normally at rest, at least one of said forces being produced by an electromagnetic device, means responsive to a change in the work of the motor for causing said forces to become unbalanced, and means controlled by the unbalanced force to correspondingly control the motor.

10. The combination with an electric motor, of controlling means, and a constant electromotive force supply circuit, said controlling means comprising two motor elements and a variable resistance in a branch circuit across said supply circuit, one of said motor elements being connected between one terminal of the resistance and one of the supply conductors, and the other motor element being connected between another terminal of the resistance and the other supply conductor, a movable element for adjusting the resistance, and a conductor leading from said movable element to one terminal of said first named motor.

11. The combination of a constant electromotive force supply circuit, an electric motor, an electromagnetic force producing winding and a resistance in a branch circuit from said supply circuit, the circuit passing from one supply wire through said winding and through said resistance to the other supply wire, a force producing device which acts counter to said electromagnetic force and normally balances it, a movable element for said resistance, the potential upon which may be varied by adjustment over said resistance, and a connection from said movable element to one terminal of said motor.

12. The combination of a constant electromotive force supply circuit, an electric motor, said motor having a field winding responsive to a voltage different from that across the motor armature terminals, an armature rheostat for said motor, an electromagnetic force producing device responsive to a change in speed of the motor tending to vary the resistance of said rheostat in one direction, a force producing device tending to vary the resistance of said rheostat in the opposite sense, said two forces being normally balanced, and means for causing the unbalanced force resultant upon a change in the speed of the motor to vary said rheostat and thereby regulate the motor speed.

13. The combination of a constant electromotive force supply circuit, an electric motor, a speed controlling rheostat in series with the armature thereof across the supply circuit of constant electromotive force, a controlling circuit leading from a point between the motor armature and rheostat to one of the supply wires, an electromagnetic device producing a mechanical force and having a winding connected to said controlling circuit, a device producing a counter mechanical force, the forces of said two devices being normally balanced, and means controlled by any relative change in said forces for controlling said rheostat.

14. The combination of a supply circuit, an electric motor, a controlling rheostat connected in series with the motor armature across said supply circuit, a rheostat connected in a branch circuit across the supply circuit and having a movable element, means for developing two normally balanced opposing forces, means for causing at least one of said forces to be responsive to the difference of potential between said movable element and a point between the motor armature and said controlling rheostat, and means controlled by any unbalanced force resultant from variations of normal condition for automatically varying said controlling rheostat.

15. The combination of a constant electromotive force supply circuit, an electric motor, a rheostat for individually controlling an element of said motor independently of other translating devices connected to said supply circuit, said rheostat being in series with said motor element across said supply circuit, two devices producing counter mechanical forces, the forces produced being normally balanced and becoming unbalanced upon change of circuit conditions from normal conditions and at least one of said devices being an electro-magnetic device, and means for causing the unbalanced force resultant upon change of circuit conditions to automatically vary said rheostat and thereby restore normal conditions.

16. The combination of a device to be controlled, and controlling means therefor comprising two electric motors the armatures of which normally produce equal and opposing torques, means for causing said torques to be unbalanced upon change from normal conditions of said device, and means controlled by the unbalanced torque for automatically restoring normal conditions.

17. The combination with an electric motor, of means for automatically controlling the same comprising two electric motors the armatures of which are connected to have their torques opposing each other and normally balanced, means for affecting the motor to be controlled, the armature of one of said two motors tending to adjust said latter means to affect the motor in one sense and the motor armature of the other of said two motors tending to adjust said latter means to affect the motor in the opposite sense, and means dependent upon the work performed by the motor controlled under certain conditions for automatically unbalancing the torques of the armatures of said two motors whereby said first named motor is automatically controlled.

18. The combination of an electric motor having a field winding and an armature winding, means controlled by said motor for affecting the condition of a fluid, a rheostat in series with only one of said windings of the motor, and means comprising an electromagnetic device responsive to the condition of the fluid for automatically varying the resistance of said rheostat so as to operate the motor at such different constant speeds as will maintain a constant condition of said fluid.

In testimony whereof I affix my signature, in presence of two witnesses.

H. WARD LEONARD.

Witnesses:
HERM EDMUNDS,
BYRON E. ELDRED.